(12) United States Patent
Prasad et al.

(10) Patent No.: US 9,125,113 B2
(45) Date of Patent: Sep. 1, 2015

(54) DEVICE MOBILITY BASED SCANNING PERIOD CONTROL

(75) Inventors: Athul Prasad, Espoo (FI); Carl S. Wijting, Espoo (NL); Jari Petteri Lunden, Espoo (FI); Osman Nuri C. Yilmaz, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 98 days.

(21) Appl. No.: 13/249,362

(22) Filed: Sep. 30, 2011

(65) Prior Publication Data

US 2013/0084856 A1    Apr. 4, 2013

(51) Int. Cl.
*H04M 3/00* (2006.01)
*H04W 4/00* (2009.01)
(Continued)

(52) U.S. Cl.
CPC .......... *H04W 36/0088* (2013.01); *H04W 36/30* (2013.01); *H04W 36/32* (2013.01)

(58) Field of Classification Search
CPC ..... H04W 24/00; H04W 28/02; H04W 36/00; H04W 36/0061; H04W 36/0066; H04W 36/0094; H04W 36/32; H04W 36/30; H04W 48/00; H04W 48/04; H04W 48/06; H04W 36/0088; H04W 52/0258; H04W 88/02; H04W 88/06
USPC .................. 455/134–135, 452.1–452.2, 434, 455/436–451, 154.2, 160.1–160.3, 127.5, 455/421, 552.1, 553.1, 41.2, 67.11, 455/418–420, 453, 456.1–456.3, 455/456.5–456.6, 457, 524–525, 550.1, 455/556.2, 561; 370/338, 310, 328–334, 370/341

See application file for complete search history.

(56) References Cited

U.S. PATENT DOCUMENTS

| 5,794,146 | A | 8/1998 | Sevcik et al. ................. 455/434 |
| 6,385,460 | B1 | 5/2002 | Wan ............................. 455/515 |

(Continued)

FOREIGN PATENT DOCUMENTS

| EP | 2355582 A1 | 8/2011 |
| JP | 2006246121 A | 9/2006 |

(Continued)

OTHER PUBLICATIONS

3GPP TSG WG2 #75, Vodafone, "Improving Mobility Towards Small Cells", R2-114005, (Aug. 22-Aug. 26, 2011), (pp. 1-5).

(Continued)

*Primary Examiner* — Meless Zewdu
(74) *Attorney, Agent, or Firm* — Harrington & Smith (57) ABSTRACT

A user equipment UE selects between a first scanning mode and a second scanning mode using at least inputs of signal quality of a link with an access node and at least one of UE speed and network type of the access node. It then determines a scanning rate using the selected scanning mode and the UE speed, and detects and measures inter-frequency neighbor cells according to the determined scanning rate. In one example both modes the increase scanning rate for increased UE speeds, except that for the first mode speeds above $V_{t1}$ yield a zero scanning rate regardless of UE speed and for the second mode speeds above $V_{t2}$ yield a constant maximum scanning rate regardless of UE speed. In an embodiment the second mode is selected when the UE speed is $>V_{t1}$, and the signal quality is less than a predetermined minimum. Various other examples are detailed.

26 Claims, 6 Drawing Sheets

(51) Int. Cl.
*H04W 36/00* (2009.01)
*H04W 40/00* (2009.01)
*H04W 36/30* (2009.01)
*H04W 36/32* (2009.01)

(56) References Cited

U.S. PATENT DOCUMENTS

| | | | |
|---|---|---|---|
| 7,408,506 B2 | 8/2008 | Miller | 342/357.17 |
| 7,822,436 B2* | 10/2010 | Bitran et al. | 455/550.1 |
| 7,920,838 B2* | 4/2011 | Doradla et al. | 455/161.1 |
| 7,965,672 B2 | 6/2011 | Kim | 370/327 |
| 8,165,583 B2* | 4/2012 | Parron et al. | 455/435.2 |
| 8,270,975 B2 | 9/2012 | Kim et al. | 455/436 |
| 2002/0147024 A1* | 10/2002 | Wan | 455/515 |
| 2006/0119508 A1 | 6/2006 | Miller | 342/357.17 |
| 2007/0184835 A1* | 8/2007 | Bitran et al. | 455/434 |
| 2009/0061877 A1* | 3/2009 | Gallagher et al. | 455/436 |
| 2009/0296652 A1* | 12/2009 | Rudowicz et al. | 370/331 |
| 2010/0008323 A1 | 1/2010 | Deshpande et al. | 370/331 |
| 2010/0113036 A1 | 5/2010 | Cho et al. | 455/444 |
| 2010/0151857 A1* | 6/2010 | Brisebois et al. | 455/434 |
| 2011/0124334 A1 | 5/2011 | Brisebois et al. | 455/434 |
| 2011/0312274 A1* | 12/2011 | Hildebrand et al. | 455/62 |
| 2012/0094664 A1* | 4/2012 | Jung et al. | 455/434 |
| 2013/0072189 A1* | 3/2013 | Cheng et al. | 455/436 |

FOREIGN PATENT DOCUMENTS

| | | |
|---|---|---|
| JP | 2007027877 A | 2/2007 |
| JP | 2007515833 A | 6/2007 |
| JP | 2008131510 A | 6/2008 |
| WO | WO 99/62285 | 12/1999 |
| WO | WO-2008060236 A2 | 5/2008 |
| WO | WO 2009/146349 A1 | 12/2009 |
| WO | WO-2011123006 A1 | 10/2011 |

OTHER PUBLICATIONS

3GG TS 36.304 V10.1.0 (Mar. 2011), Technical Specification, 3rd Generation Partnership Project; Technical Specification Group Radio Access Network; Evolved Universal Terrestrial Radio Access (E-UTRA); User Equipment (UE) Procedures in Idle Mode (Release 10); (33 pages).

3GPP TSG-RAN WG2 #74; R2-113302; Barcelona, Spain, May 9-14, 2011; Agenda item: 7.6 Source: LG Electronics Inc.; Title: Mobility state detection enhancement for HetNet (2 pages).

* cited by examiner

DEVICE MOBILITY BASED SCANNING PERIOD CONTROL

TECHNICAL FIELD

The exemplary and non-limiting embodiments of this invention relate generally to wireless communication systems, methods, devices and computer programs and, more specifically, relate to user equipment mobility and scanning inter-frequency neighbor cells including cells of the same radio access technology and different from the serving cell.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
eNB base station in a LTE network
GPS global positioning system
LTE long term evolution (evolved UTRAN or EUTRAN)
RAT radio access technology
RF radio frequency
UE user equipment
UTRAN universal terrestrial radio access network
WiFi wireless fidelity (IEEE 802.11 family of standards)

Figure 1:
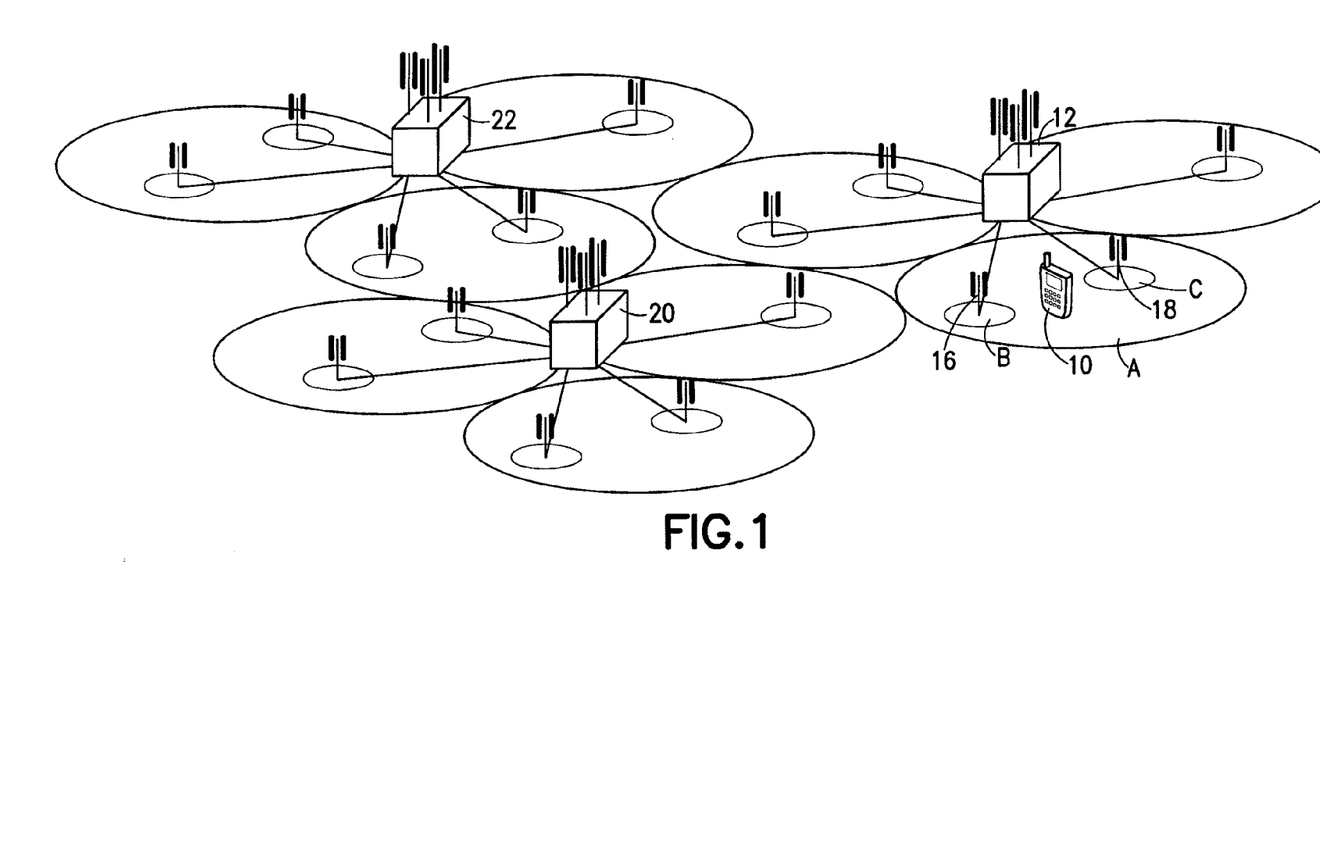
FIG. 1 illustrates a heterogeneous network including macros cells and pico cells with a UE moving amongst them, and is an exemplary radio environment in which embodiments of these teachings may be practiced to advantage.

Recent progression in the wireless arts include the deployment of smaller cells within the coverage areas (or extending the coverage area) of conventional cells. In at least the LTE system these smaller cells are generally termed pico or femto cells while the conventional cells are distinguished by the term macro cell, with the aggregated deployment referred to as a heterogeneous network or HetNet for short. An exemplary HetNet is shown at FIG. 1, in which there are pico eNBs 16, 18 with control over relatively small cells B, C are within the coverage area of a macro cell A controlled by a macro eNB 12. It is conventional to use the terms cell and eNB or access node interchangeably, so for example the UE 10 with the macro cell 12 as its serving cell will as shown in FIG. 1 see cells 16 and 18 as neighbor cells.

HetNet deployments also provide the opportunity to offload traffic from crowded cellular frequency bands to other non-cellular frequency bands such as for example license-exempt WiFi bands and pico cells operating on license-exempt secondary component carriers. Such interworking in HetNets is not yet fully developed and there are many open issues yet to be worked out. The 3GPP standardization of LTE-Advanced is undergoing some of this development, but one open issue is how to arrange for UEs to scan inter-frequency small neighbor cells in a HetNet that is power efficient for the UE's limited power supply.

Current LTE specifications provide for a UE mobility state estimation (MSE) which is based on the number of cell reselections (for a UE in the idle mode) or handovers (for a UE in the connected mode) the UE has undergone over a predefined period of time. This ratio serves as a proxy for the UE's relative speed. For idle mode UEs having medium and high mobility states, the UE will add an offset to the signaled cell reselection margin (the parameter $Q_{hyst}$ which is a hysteresis value) and scales the value for $T_{reselection}$ by a factor. $T_{reselection}$ is a time value signaled also in system information against which a UE will test the received signal strength (or power) of a best neighbor cell against that of its serving cell; if the received signal strength/power from the neighbor cell exceeds that from the serving cell for the duration $T_{reselection}$ the UE is to reselect to that neighbor cell. The connected mode UE will scale its time-to-trigger by a factor. Time to trigger is a delay period during which a UE having received new parameters is not allowed to change its operational state; introducing this hysteresis prevents the UE from transitioning too quickly from connected to idle and back to connected states again by imposing a minimum time for its transition out of the connected state. These scaling factors are parameters signaled by the network and are used at least in part to optimize mobility for fast moving UEs.

These factors were not designed with HetNets in mind, but rather for the case where the UE in FIG. 1 would see only macro neighbor cells 20, 22; at that time pico neighbor cells 16, 18 were not a part of the radio environment. The addition of all those other pico cells to the radio environment would mean higher power consumption and a faster drawdown of the UE's power supply if the UE were to scan all those small cells, or measure all the small cells it detects, according to the conventional procedure. There is a need for new network scanning schemes for different user velocities to overcome the draining of battery power, as well as to support high-speed mobility as envisioned in LTE-Advanced systems.

One relevant document is U.S. Pat. No. 7,408,506 which proposes a scanning rate control mechanism that increases the scanning rate proportional to the velocity of the mobile terminal. The velocity is measured based on the signal strength data received from a WiFi receiver and a cellular receiver as well as position and velocity data obtained from a GPS receiver. This solution proposes to control the scanning rates of the GPS receiver, the cellular receiver and the WiFi receiver. In the inventors' view, increasing the scanning rate in conjunction with the mobile's velocity as this document sets forth will serve to increase power consumption.

Another relevant document is R2-114005 by Vodafone and entitled IMPROVING MOBILITY TOWARDS SMALL CELLS (3GPP TSG RAN WG2 Meeting #75; Athens, Greece; 22-26 Aug. 2011). This document targets intra-frequency cells, those operating on a same frequency band as the mobile's serving cell. The problem with intra-frequency cells is quite different than that with inter-frequency cells, in that delays in finding small intra-frequency cells can cause severe interference problems since the intra-frequency small cells will act as interferers. That problem is not present in the inter-frequency case in which the goal is to find offloading opportunities in a power efficient manner. Additionally, while document R2-114005 may reduce how often cell changes are triggered via manipulating the $T_{reselection}$ parameter, the UE is still expending large amounts of power in taking those measurements it never sends.

What is needed in the art is a way for the UE to scan for offload opportunities in a power efficient manner, where the offload opportunities are identified by scanning for inter-frequency neighbor cells whether they are operating on the same RAT as the UE's serving cell or on a different RAT.

SUMMARY

In accordance with a first aspect of the invention there is an apparatus comprising at least one processor and at least one memory including computer program code. In this first aspect the at least one memory and the computer program code are configured, with the at least one processor, to cause the apparatus at least to: select between a first scanning mode and a second scanning mode using at least inputs of signal quality of a link with an access node and at least one of user equipment speed and network type of the access node; determine a scanning rate using the selected scanning mode and the user equipment speed; and detect and measure inter-frequency neighbor cells according to the determined scanning rate.

In accordance with a second aspect of the invention there is a method comprising: selecting between a first scanning mode and a second scanning mode using at least inputs of signal quality of a link with an access node and at least one of user equipment speed and network type of the access node; determining a scanning rate using the selected scanning mode and the user equipment speed; and detecting and measuring inter-frequency neighbor cells according to the determined scanning rate.

In accordance with a third aspect of the invention there is a computer readable memory storing a program of instructions which when executed by at least one processor result in actions comprising: code for selecting between a first scanning mode and a second scanning mode using at least inputs of signal quality of a link with an access node and at least one of user equipment speed and network type of the access node; code for determining a scanning rate using the selected scanning mode and the user equipment speed; and code for detecting and measuring inter-frequency neighbor cells according to the determined scanning rate.

These and other aspects are detailed further below with particularity.

DETAILED DESCRIPTION

It is often preferred that a fast moving UE not handover or reselect to a pico cell which is otherwise a good handover/reselection candidate, because the fast moving UE will traverse the small coverage area of the pico cell in relatively short time requiring still another handover or reselection, and in the case of an idle mode UE possibly also diminished paging reception after reselecting to the small cell. There is also a need to reduce the scanning frequency of different RAT cells under certain conditions to conserve the UE's power supply.

In accordance with exemplary aspects of these teachings, when in a high mobility state or otherwise at high speeds if the signal strength of the current (serving cell) link is good the UE does not try to detect or measure other frequency small cells at all, or alternatively it does so only infrequently. This prevents unfavorable connection/handover to them, and in certain embodiments also renders the UE's need to know the physical cell identity (PCI) value for the small cell and/or the time to trigger values for mobility (as currently specified and as detailed above for the LTE system) as no longer necessary for the UE.

According to exemplary embodiments of these teachings there are defined two scanning rate modes for scanning of inter-frequency neighbors. These can be applied to either cellular or inter-RAT (such as WiFi) neighbors, but in the embodiments below it is assumed these modes and the selection between them is applied to both inter-frequency same-RAT cellular and inter-frequency inter-RAT neighbor cells. For convenience these are termed scanning mode 1 and scanning mode 2 below.

Scanning mode 1 is characterized in that the receiver scanning rate increases as UE speed increases until a threshold speed ($V_{t1}$) after which the scanning is either stopped, or in an alternative embodiment made extremely infrequent. In either case the rate for UE speed above $V_{t1}$ is constant and at or near a minimum for scanning mode 1.

Figure 2A:
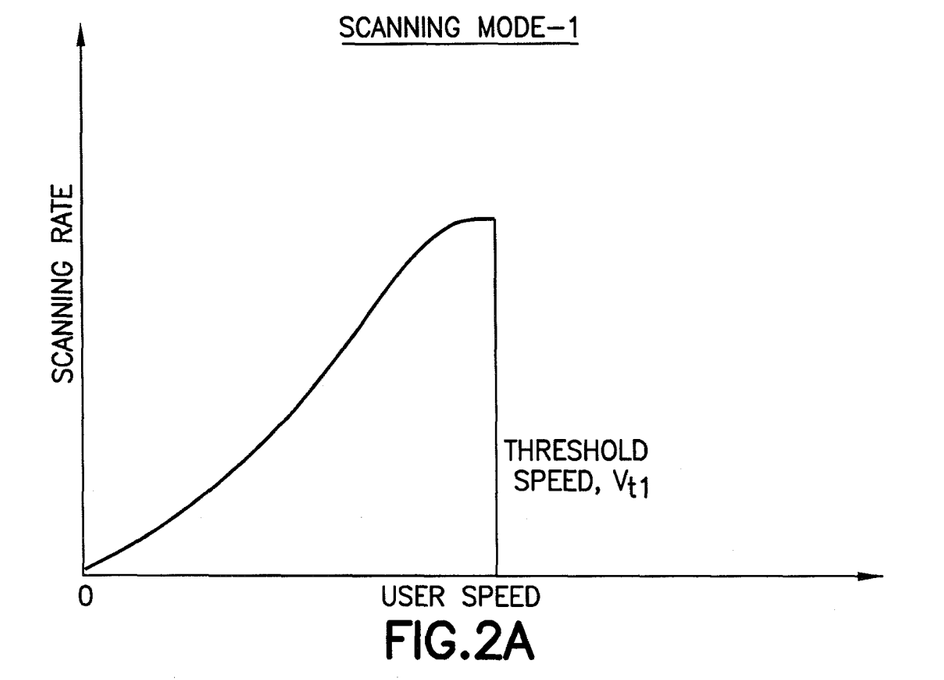
FIGS. 2A-B are plots of scanning rate versus UE speed for exemplary but non-limiting embodiments of the first and second scanning rate modes, respectively, according to an exemplary embodiment presented herein.

An exemplary curve of scanning rate versus UE speed is shown at FIG. 2A; entering the curve with UE speed outputs the scanning rate at which the UE is to scan its inter-frequency neighbor cells. Note that where the curve begins, an input UE speed of zero results in an output scanning rate also zero (or a very infrequent scanning rate, to account for possible errors in measuring/estimating UE speed and for the possibility of a new small cell becoming active); the stationary UE discontinues scanning (both detecting and measuring) of its inter-frequency neighbor cells.

At the high speed end where UE speed is greater than $V_{t1}$, FIG. 2A shows also that scanning rate is zero but in another embodiment it may be marginally higher. In any case the scanning rate that is output for scanning mode 1 when the input UE speed is greater than $V_{t1}$ is at or near a minimum for scanning mode 1.

$V_{t1}$ is defined as speed above which the UE cannot establish a reliable connection to a network for a reasonable amount of time. So for example $V_{t1}$ can be based on the typical small cell size and how long it would take for the UE at the given speed to move that distance, compared to how long it takes to establish a connection to the cell.

For both scanning modes 1 and 2 there are multiple ways to obtain the UE speed. In one implementation it may be computed using UE acceleration measured using an accelerometer internal to the UE which is present in essentially all new smartphones. And/or the speed may be obtained using position and velocity data from GPS measurements if the UE has GPS capability. And/or the speed may be obtained from received signal strength from the WiFi and/or cellular receivers of the UE. Whether one or more of the above is used, UE speed samples may be averaged by the UE for input into the scanning mode selection algorithm, in order to address problems arising from irregular movement patterns and/or speed measurement inaccuracies. In this manner anomalous individual measurements, such as short stops arising from the UE being in an automobile that stops momentarily then continues moving at highway speeds, would not immediately trigger a change of the scanning period/rate or mode.

Figure 2B:
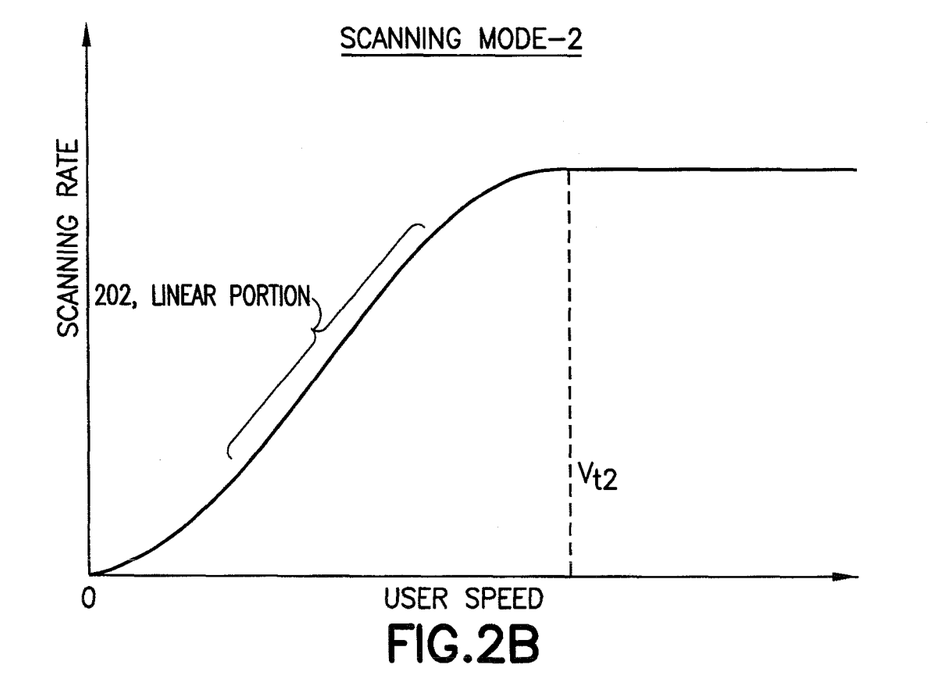

Scanning mode 2 is characterized in that it also outputs an increasing scanning rate for increased UE speed input, until very high user speeds after which the scanning rate remains constant at or near a maximum rate for scanning mode 2. Arbitrarily term this inflection point in scanning rate versus UE speed as $V_{t2}$. FIG. 2B shows a non-limiting embodiment in which at least a portion 202 of the rate versus speed curve is linear, so that a linear increase to input UE speed will result in a linear increase in scanning rate that is output for the UE to follow.

In the examples below, when a UE is connected to a small cell (femtocell or pico-cell) network, the cellular and WiFi receivers will be scanning using scanning mode 2. The rate of scanning rate increase for the linear portion 202 of scanning mode 2 can be proportional to the cell size so that for example a UE 10 connected to a home eNB (HeNB) has a steeper increase of scanning rate than a UE connected to a larger pico cell. That is, there may be multiple speed versus rate curves for the mode 2 scanning, each specific to a range of cell size and each differing from one another in the slope of the linear portion 202 of the curve.

If the UE 10 is connected to a macro-size cell, it follows scanning mode 1. The received signal power level ($R_x$) at the UE is constantly monitored in this case and if it falls below a defined minimum level ($R_{x-min}$), the scanning mode is switched to mode 2. The power threshold $R_{x-min}$ is defined in this embodiment as the power level below which the quality of services deteriorates below the prescribed limit, where typically it will be the published cellular standard which sets the prescribed limit. More generally it is signal quality in a link with an access node which is compared to the predefined threshold, where signal quality may be expressed as reference signal received power or quality RSRP or RSRQ, received signal strength RSS, received signal power, signal to noise plus interference ratio SINR, quality of service QoS, block or bit error rate BLER or BER, or similar objectively measurable thresholds.

As is clear from FIGS. 2A-B, both scanning mode 1 and mode 2 are variable rate models whose rate varies with UE speed. Both stop scanning when the UE 10 is not in motion, mode 1 stops scanning when the UE is moving very fast (above $V_{t1}$), and mode 2 holds the scanning rate to a maximum also when the UE is moving very fast (above $V_{t2}$.). In the exemplary embodiments of FIGS. 2A-B the thresholds $V_{t1}$ and $V_{t2}$ are not identical.

In another embodiment, rather than smooth rate versus speed curves the modes are implemented as rate versus UE mobility state (for example, slow, medium and fast). In this alternative embodiment the UE determines its mobility state as given by a defining speed range and instead of a smooth curve the rate versus state is a stepped curve, but the broad characteristics of the mode curves remain similar to those shown in the smooth curves of FIGS. 2A-B. In this embodiment the UE would not compute its mobility state as is done in the LTE system (counting the number of cell reselections or handovers per fixed time period) since that technique depends on a common scan rate for all the mobility states and these teachings involve a variable scanning rate based on speed (or mobility state which functions as a proxy for speed).

The conditions for selecting scanning mode 1 or mode 2 are the type of network to which the UE is currently connected (the network of its serving cell or access point) and signal quality of the link with the serving cell/access point, where signal quality may be expressed as any of the above examples (RSRQ, RSRP, RSS, SINR, etc.). The examples below use the term $R_x$ for received signal power but this is non-limiting to the broader teachings herein. For example, if the connected-to network is a small cell network (WiFi or a pico/femto cell) the scanning mode will initially be mode 2 until changed by the process of FIG. 3 or similar decision logic. Since it is not practical or even possible in some instances for a high-speed UE to connect to a WiFi or other small-cell network, even if the cellular/WiFi receivers are able to detect the network cell(s), exemplary embodiments of these teachings avoid scanning for those in order to save valuable UE battery power. In other embodiments there are additional conditions for selecting of the scanning mode, such as the UE speed.

Figure 3:
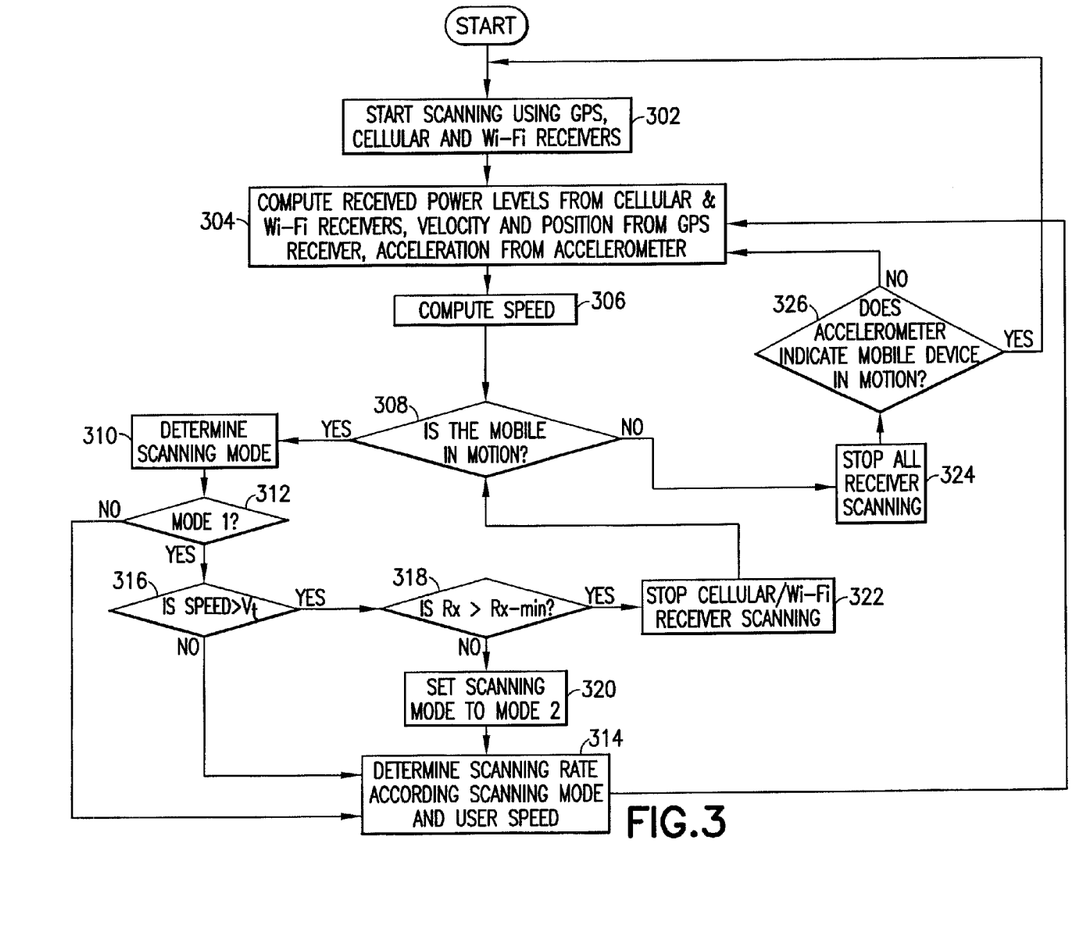
FIG. 3 is a flow diagram illustrating an overall process for selecting between the first and the second scanning rate mode according to one exemplary embodiment presented herein.

FIG. 3 is a flow diagram illustrating one exemplary embodiment for selecting which scanning mode and from that selected scanning mode finding the inter-frequency neighbor cell scanning rate. As a preliminary overview, first assume the UE is connected to a small-cell (femtocells or a pico-cell network). Since the probability of it moving out of the coverage area of the network is high, the cellular and WiFi receivers of the UE will be scanning using scanning mode 2. The scanning rate therefore increases according to the user speed until it reaches the maximum scanning rate $V_{t2}$. This is done until the UE moves out of the small-cell coverage area and connects to a macro-cell. The rate of increase of scanning rate in scanning mode 2 can be proportional to the cell size so that, for example, a UE connected to a HeNB has a steeper increase of scanning rate than a UE connected to a larger pico cell, reflecting the fact that at a given speed it takes the UE less time to move out of a smaller cell. If the UE is connected to a macro-cell, it follows scanning mode 1. In that mode the scanning rate is increased until it reaches the threshold speed $V_{t1}$, after which scanning is stopped.

More specific to FIG. 3, at block 302 the UE starts scanning using its GPS, cellular and WiFi receivers. At block 304 the UE measures received signal power from its cellular and WiFi receivers, and measures its velocity and position from its GPS receiver (and possibly also acceleration from its accelerometer). From the GPS and/or accelerometer information the UE computes its speed at 306. So long as the check at block 308 shows the UE is not stationary over some minimum time period then the decision tree moves to block 310. If the UE is stationary at block 308 then the UE stops all WiFi and cellular receiver scanning at block 324 and checks its accelerometer (and possibly also its GPS receiver if that is not stopped) at block 326 and returns to start once the UE is in motion. Block 324 is shown separately but the same result will obtain if the decision tree is followed to block 314 so long as the rate for a zero speed UE in both scanning modes is zero as it is in the FIG. 2A-B examples.

If the UE is connected to a small cell network (via the WiFi receiver or via its cellular receiver connected to a small cell), it should be in scanning mode 2 as noted above. This is the determination at block 310 and so the decision from block 312 leads directly to block 314 and the UE enters as inputs to the algorithm its UE speed from block 306 to find the scanning rate it will use for all of its inter-frequency neighbor cells.

If instead the UE is connected to a macro cell (via the cellular receiver) then the determination at block 310 is that the UE is in scanning mode 1 as outlined above, and the decision from block 312 leads to the speed check at block 316. This is where the speed of the UE is relevant to the scanning mode selection; if the US speed from block 306 is greater than the mode 1 threshold speed $V_{t1}$, then the received signal power $R_x$ from the serving cell/access point (which was computed at block 304) is compared to the minimum received power level $R_{x-min}$, and if less than the scanning mode is changed to mode 2 at block 320 but if more (or not less) then scanning is stopped at block 322 and the decision logic returns to block 308.

If the UE speed check at block 316 finds the UE speed less than (or equal to) the mode 1 threshold speed $V_{t1}$, the UE stays in scanning mode 1 and at block 314 reads the scanning rate for mode 1 corresponding to the UE speed. Similarly, if the received signal power check at block 318 finds the received signal power $R_x$ less than the minimum received power level $R_{x\text{-}min}$, the scanning mode is changed to mode 2 at block 320 and at block 314 the UE reads the scanning rate for mode 2 corresponding to the UE speed computed at block 306. The minimum received power threshold $R_{x\text{-}min}$ is in certain exemplary embodiments defined as the power level below which the quality of services deteriorates below the prescribed limit.

Figure 4:
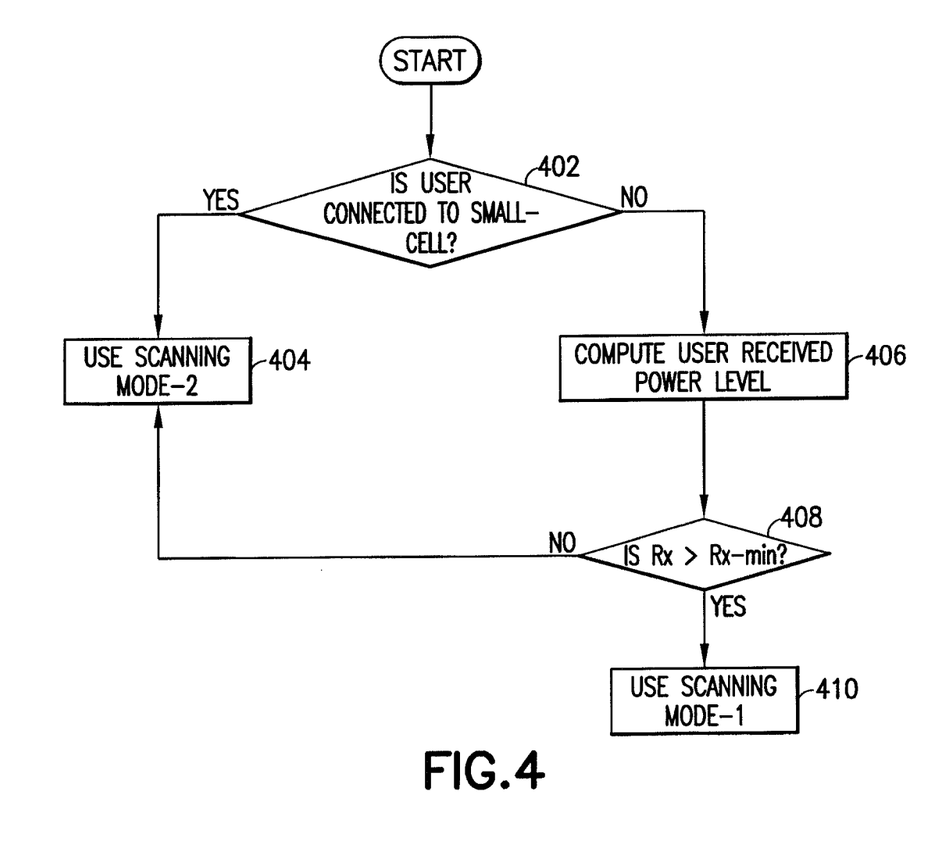
FIG. 4 is a flow diagram similar to FIG. 3 but according to another exemplary embodiment presented herein.

In the FIG. 4 embodiment the received power level $R_x$ of the UE is constantly monitored at block 406 anytime the UE is connected to a macro/large cell at block 402 to see if it falls below that defined minimum level $R_{x\text{-}min}$ at block 408. If yes then the UE selects scanning mode 1 and if no it selects scanning mode 2. Also, scanning mode 2 is selected anytime the UE is connected to a small cell at block 402. Whereas the FIG. 3 flow chart makes the inputs to the scanning mode selection algorithm the UE speed and the received signal power from the serving cell/access point, the inputs to the scanning mode selection algorithm of FIG. 4 takes inputs of network type and received signal power from the serving cell/access point.

One purpose for scanning mode 1 is that if the UE is moving really fast, the probability of detection and making handovers to a new network, especially a small-cell network, is quite low and so it is counter-productive to scan for networks if the currently established link quality is reasonably good. Scanning and subsequently handovers are efficient only if the current link quality is deteriorating. Here the assumption is that the newly detected network/inter-frequency neighbor cell is a small-cell network and so offers only limited coverage. This is due to the fact that if the link quality with the large/macro cell is good, it implies that the UE is still within the coverage area of the large/macro cell.

Alternatively, the constant monitoring of received power levels ($R_x > R_{x\text{-}min}$) operates as a failsafe mechanism against faulty speed measurement leading to outages, making these embodiments robust. Additionally, velocity estimates can be made based on the change in instantaneous values of the received power levels.

Various of the above implementations will provide one or more of the following technical effects. First, these teachings provide the advantage of better battery performance, even when the UE is travelling at very high speeds. Currently there is a heavy drain on battery reserves due to excessive scanning done at high-speeds. Second, certain embodiments avoiding unnecessarily quick handovers to inter-frequency small cells by high speed UEs, which would in the end cause almost immediate ping ponging handovers back to the large/macro cell layer when the UE leaves the small cell soon again (or dropping the connection in the case of WiFi). Third, the less frequent scanning yields a more limited volume of signaling, which means there is a more optimized information exchange between the UE and the network.

Figure 5:
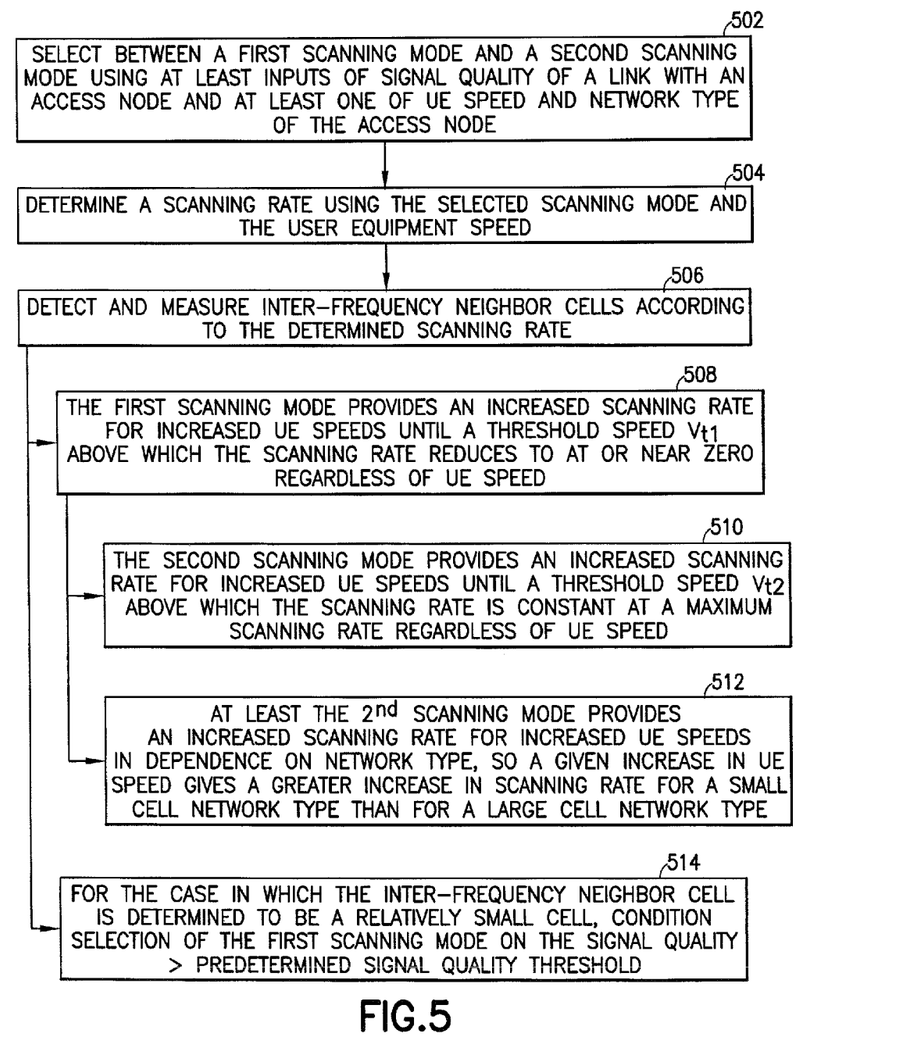
FIG. 5 is a logic flow diagram illustrating the operation of a method, and a result of execution of computer program instructions embodied on a computer readable memory, in accordance with exemplary embodiments of these teachings.

The flow diagram of FIG. 5 illustrates some of the above exemplary embodiments from the perspective of the UE 10, or from one or more components thereof. The term access node is used generically to refer to a cellular base station (macro or pico/femto cell) or a WiFi access point or similar such network access nodes. At block 502 the UE selects between a first scanning mode and a second scanning mode using at least inputs of signal quality of a link with an access node, and at least one of UE speed and network type of the access node. At block 504 the UE determines a scanning rate using the selected scanning mode and the UE speed (for example, accessing the algorithms that generate either FIG. 2A or 2B with the UE speed to output the scanning rate); and at block 506 the UE detects and measures inter-frequency neighbor cells according to the determined scanning rate.

Further portions of FIG. 5 summarize certain of the various non-limiting embodiments and implementations which were detailed above. At block 508 the first scanning mode provides an increased scanning rate for increased user equipment speeds until a first threshold speed $V_{t1}$ above which the scanning rate reduces to at or near zero regardless of user equipment speed. See for example FIG. 2A. Block 510 details that the second scanning mode provides an increased scanning rate for increased user equipment speeds until a second threshold speed $V_{t2}$ above which the scanning rate is constant at a maximum scanning rate regardless of user equipment speed. See for example FIG. 2B.

Not shown specifically at FIG. 5 but instead at blocks 316, 318 and 320 of FIG. 3, the second scanning mode is selected at least when the UE speed is greater than the first threshold speed $V_{t1}$, and the signal quality of the link (the received signal power $R_x$ in the above examples) is less than a predetermined minimum signal quality (minimum received signal power $R_{x\text{-}min}$ in the above examples). Block 512 of FIG. 5 details that at least the second scanning mode provides an increased scanning rate for increased user equipment speeds in dependence on network type, such that for a given increase in user equipment speed there is a greater increase in scanning rate for small cell network type than for a large cell network type.

For the FIG. 3 embodiment in which network type is additionally taken into account, the inputs for selecting between the first and second scanning modes comprise signal quality of the link with the access node, the UE speed, and the network type of the access node.

At block 514 of FIG. 5 is detailed that the selecting of block 502 results in the second scanning mode being selected when the network type is a small cell regardless of the signal quality of the link; and the first scanning mode being selected when the network type is a large cell and the signal quality of the link is greater than a predetermined minimum signal quality. This is shown particularly at FIG. 4 where the inputs to the scanning mode selection algorithm are received signal strength and network type.

Additionally and as noted above, the user equipment may determine its speed from any one or more of: an accelerometer disposed within the user equipment; position and velocity data obtained from a GPS receiver disposed within the user equipment; and variations in received signal strength (or other measure of signal quality) between WiFi and cellular receivers disposed within the user equipment.

Further, to exclude including temporary stops in UE speed when the UE is for example in a moving automobile, the user equipment speed may be determined by averaging individual speed measurements over time, in which individual speed measurements characterized by a short duration and a negligible speed are excluded from the averaging. For example, the short duration may be anything less than one minute (or 30, or 20 seconds) to filter out stops at typical traffic lights, and negligible speed may be less than 5 miles per hour to filter out a car's intermittent movement continually re-starting the duration timer.

FIG. 5 may be considered to be a logic flow diagram that illustrates the operation of a method, and a result of execution of computer program instructions, in accordance with the exemplary embodiments of this invention, such as for example from the perspective of the UE 10. The various blocks shown in FIG. 5 may be viewed as method steps, and/or as operations that result from operation of computer program code, and/or as a plurality of coupled logic circuit elements constructed to carry out the associated function(s).

For example, the UE 10, or one or more components thereof, can form an apparatus comprising at least one processor and at least one memory including computer program code, in which the at least one memory and the computer program code are configured to, with the at least one processor, cause the apparatus to perform the elements shown at FIG. 5 and/or recited in further detail above.

Figure 6:
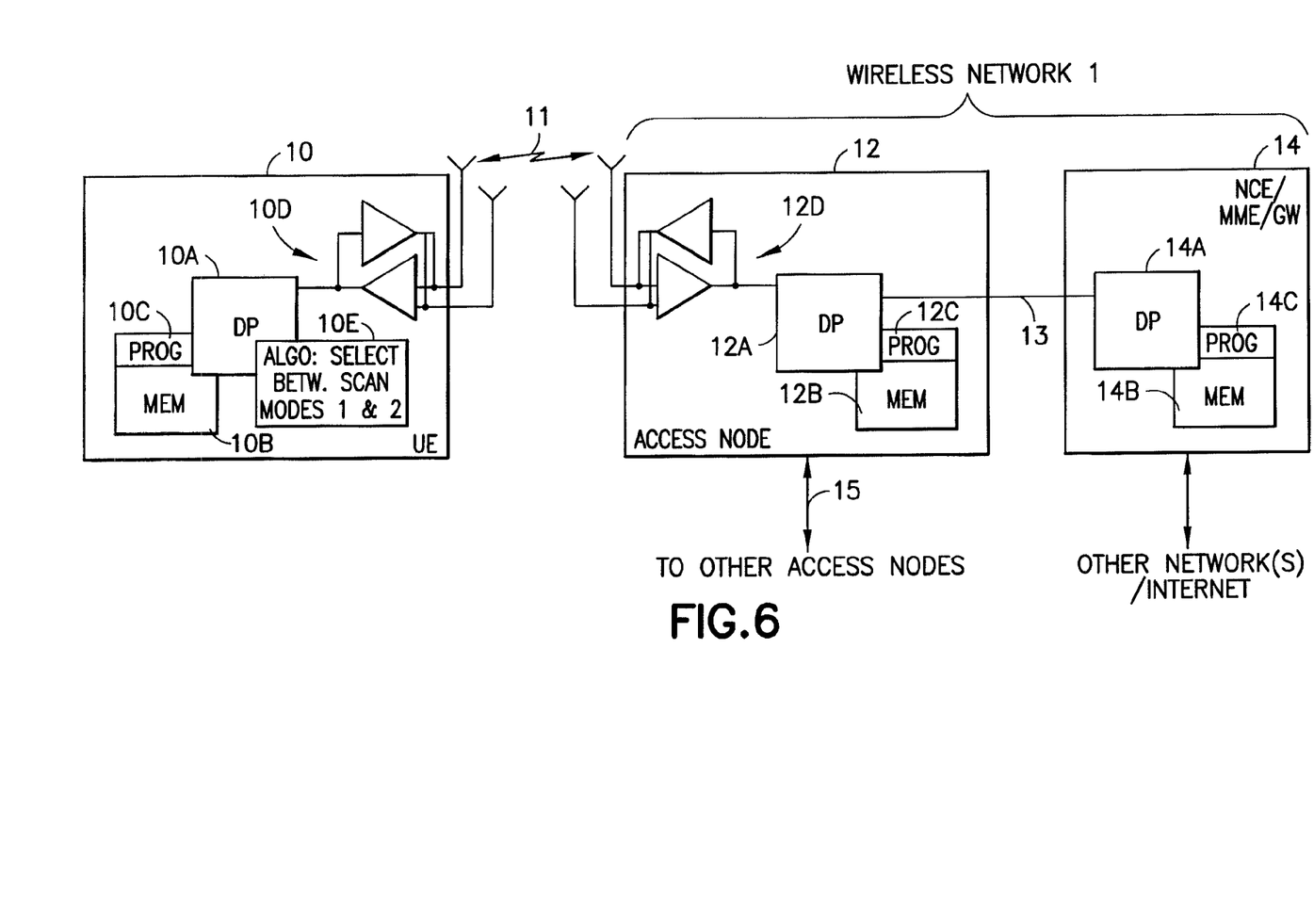
FIG. 6 shows a simplified block diagram of certain apparatus which may be utilized to practice the invention according to certain of the embodiments presented herein.

FIG. 6 illustrates a simplified block diagram of various electronic devices and apparatus that are suitable for use in practicing the exemplary embodiments of this invention. In FIG. 6 a wireless network 1 is adapted for communication over a wireless link 11 with an apparatus, such as a mobile communication device which above is referred to as a UE 10, via a serving network access node 12 which may in various instances be embodied as an eNB or a WiFi access point. For the case in which the access node 12 is an eNB and the network 1 is a LTE network there is a network control element (NCE) 14 that may include the mobility entity/serving gateway MME/S-GW functionality known in the LTE system, and which provides connectivity with another network, such as a telephone network and/or a data communications network (e.g., the internet). For the case in which the access node 12 is a WiFi access point there need not be any higher network node 14.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D (or separate transmitter and receiver) for bidirectional wireless communications with the access node 12 via one or more antennas. The access node 12 also includes a controller, such as a computer or a data processor (DP) 12A, a computer-readable memory medium embodied as a memory (MEM) 12B that stores a program of computer instructions (PROG) 12C, and a suitable RF transceiver 12D (or separate transmitter and receiver) for communication with the UE 10 via one or more antennas. The access node 12 is coupled via a data/control path 13 to the NCE 14. The path 13 may be implemented as the S1 interface known in LTE for the case the access node 12 is an eNB, in which case it may also be coupled to another eNB via data/control path 15 implemented as the X2 interface known in LTE.

At least one of the PROGs 10C is assumed to include program instructions that, when executed by the associated DP, enable the device to operate in accordance with the exemplary embodiments of this invention, as detailed above. That is, the exemplary embodiments of this invention may be implemented at least in part by computer software executable by the DP 10A of the UE 10, or by hardware, or by a combination of software and hardware (and firmware). For the purposes of describing the exemplary embodiments of this invention the UE 10 may be assumed to also include a locally stored algorithm 10E to select between scanning modes 1 and 2 as detailed above with particularity and implemented as immediately above as stored software, firmware, hardware, or some combination thereof.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. Some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
  at least one processor; and
  at least one memory including computer program code,
  in which the at least one memory and the computer program code are configured, with the at least one processor, to cause the apparatus at least to:
    determine between a first scanning mode and a second scanning mode using an input of signal quality of a link with an access node;

determine a scanning rate using the determined scanning mode and user equipment moving speed; and detect and measure information related to inter-frequency neighbor cells according to the determined scanning rate;

in which the determined scanning rate reduces to at or near zero regardless of the user equipment moving speed when the user equipment moving speed is increased above a first threshold speed.

2. The apparatus according to claim 1, in which:
the first scanning mode provides an increased scanning rate for increased user equipment speeds below the first threshold speed.

3. The apparatus according to claim 2, in which:
the second scanning mode provides an increased scanning rate for increased user equipment speeds until a second threshold speed above which the scanning rate is constant at a maximum scanning rate regardless of by how much the user equipment speed exceeds the second threshold speed.

4. The apparatus according to claim 3, in which the at least one memory and the computer program code are configured with the at least one processor to cause the apparatus to determine the second scanning mode at least when the user equipment speed is greater than the first threshold speed, and the signal quality of the link is less than a predetermined minimum signal quality.

5. The apparatus according to claim 1, in which at least the second scanning mode provides an increased scanning rate for increased user equipment speeds in dependence on network type, such that for a given increase in the user equipment speed there is a greater increase in scanning rate for a small cell network type than for a large cell network type.

6. The apparatus according to claim 1, in which the input for determining between the first and second scanning modes comprise the signal quality of the link, the user equipment speed, and the network type of the access node.

7. The apparatus according to claim 1, in which the at least one memory and the computer program code are configured with the at least one processor to cause the apparatus to:
determine between the first scanning mode and the second scanning mode using at least inputs of the signal quality of the link and the network type;
in which the second scanning mode is determined when the network type is a small cell regardless of the signal quality of the link; and
the first scanning mode is determined when the network type is a large cell and the signal quality of the link is greater than a predetermined minimum signal quality.

8. The apparatus according to claim 1, in which the apparatus comprises the user equipment which is configured to determine the user equipment speed from at least one of:
an accelerometer disposed within the user equipment;
position and velocity data obtained from a GPS receiver disposed within the user equipment; and
variations in received signal strength between WiFi and cellular receivers disposed within the user equipment.

9. The apparatus according to claim 1, in which the user equipment speed is determined by averaging individual speed measurements over time, in which the individual speed measurements are characterized by a short duration and negligible individual speeds are excluded from the averaging.

10. The apparatus according to claim 1, in which the first scanning mode provides at least one constant scanning rate for increased user equipment speeds until a first threshold speed above which the scanning rate reduces to at or near zero regardless of the user equipment speed.

11. The apparatus according to claim 1, in which the determined scanning rate in the second scanning mode remains constant at a maximum scanning rate when the user equipment speed is above a second threshold speed, regardless of by how much the user equipment speed exceeds the second threshold speed.

12. A method comprising:
determining between a first scanning mode and a second scanning mode using an input of signal quality of a link with an access node;
determining a scanning rate using the determined scanning mode and user equipment moving speed; and
detecting and measuring information related to inter-frequency neighbor cells according to the determined scanning rate;
in which the determined scanning rate reduces to at or near zero regardless of the user equipment moving speed when the user equipment moving speed is increased above a first threshold speed.

13. The method according to claim 12, in which:
the first scanning mode provides an increased scanning rate for increased user equipment speeds until the first threshold speed is reached.

14. The method according to claim 13, in which:
the second scanning mode provides an increased scanning rate for the increased user equipment speeds until a second threshold speed above which the scanning rate is constant at a maximum scanning rate regardless of by how much the user equipment speed exceeds the second threshold speed.

15. The method according to claim 14, in which the second scanning mode is determined at least when the user equipment speed is greater than the first threshold speed and the signal quality of the link is less than a predetermined minimum signal quality.

16. The method according to claim 14, in which at least the second scanning mode provides an increased scanning rate for the increased user equipment speeds in dependence on network type, such that for a given increase in the user equipment speed there is a greater increase in scanning rate for a small cell network type than for a large cell network type.

17. The method according to claim 12, in which the input for determining between the first and second scanning modes comprise the signal quality of the link with the access node, the user equipment speed, and the network type of the access node.

18. The method according to claim 12,
in which the determining between the first scanning mode and the second scanning mode uses at least inputs of the signal quality of the link and the network type;
in which the second scanning mode is determined when the network type is a small cell regardless of the signal quality of the link; and
the first scanning mode is determined when the network type is a large cell and the signal quality of the link is greater than a predetermined minimum signal quality.

19. The method according to claim 12, in which the method is executed by the user equipment and the user equipment speed is determined from at least one of:
an accelerometer disposed within the user equipment;
position and velocity data obtained from a GPS receiver disposed within the user equipment; and
variations in received signal strength between WiFi and cellular receivers disposed within the user equipment.

20. The method according to claim 12, in which the method is executed by the user equipment and the user equipment speed is determined by averaging individual speed measurements over time, in which the individual speed measurements are characterized by a short duration and measurements of zero speed are excluded from the averaging.

21. The method according to claim 12, in which the determined scanning rate in the second scanning mode remains constant at a maximum scanning rate when the user equipment speed is above a second threshold speed, regardless of by how much the user equipment speed exceeds the second threshold speed.

22. An apparatus comprising:
   at least one processor; and
   at least one memory including computer program code,
   in which the at least one memory and the computer program code are configured, with the at least one processor, to cause the apparatus at least to:
      determine between a first scanning mode and a second scanning mode using a network type of an access node;
      determine a scanning rate using the determined scanning mode and user equipment moving speed; and
      detect and measure information related to inter-frequency neighbor cells according to the determined scanning rate;
      in which the determined scanning rate reduces to at or near zero regardless of the user equipment moving speed when the user equipment moving speed is increased above a first threshold speed.

23. The apparatus according to claim 22, in which the first scanning mode provides an increased scanning rate for increased user equipment speeds below the first threshold speed.

24. The apparatus according to claim 23, in which the second scanning mode provides an increased scanning rate for increased user equipment speeds until a second threshold speed, above which the scanning rate is constant at a maximum scanning rate regardless of by how much the user equipment speed exceeds the second threshold speed.

25. The apparatus according to claim 22, in which the first scanning mode provides at least one constant scanning rate for increased user equipment speeds below a different first threshold speed.

26. The apparatus according to claim 22, in which the scanning rate remains constant at a maximum scanning rate regardless of user equipment speed when the user equipment speed is increased above a second threshold speed.

* * * * *